United States Patent
Alasaarela

(10) Patent No.: US 11,487,127 B2
(45) Date of Patent: Nov. 1, 2022

(54) MAGNETIC SEESAW SCANNER

(71) Applicant: Microsoft Technology Licensing, LLC, Redmond, WA (US)

(72) Inventor: Tapani Matias Alasaarela, Espoo (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 394 days.

(21) Appl. No.: 16/661,861

(22) Filed: Oct. 23, 2019

(65) Prior Publication Data

US 2021/0124176 A1     Apr. 29, 2021

(51) Int. Cl.
| | |
|---|---|
| G02B 27/01 | (2006.01) |
| G02B 26/08 | (2006.01) |
| G02B 26/10 | (2006.01) |
| G09G 3/02 | (2006.01) |

(52) U.S. Cl.
CPC ....... G02B 27/0179 (2013.01); G02B 26/085 (2013.01); G02B 26/105 (2013.01); G02B 27/0149 (2013.01); G02B 27/0172 (2013.01); G02B 27/0176 (2013.01); G09G 3/02 (2013.01); G02B 2027/0123 (2013.01); G02B 2027/0154 (2013.01); G02B 2027/0187 (2013.01)

(58) Field of Classification Search
CPC .............. G02B 26/085; G02B 26/105; G02B 27/0172; G02B 27/0179; G02B 2027/0123; G02B 2027/0187
See application file for complete search history.

(56) References Cited

U.S. PATENT DOCUMENTS

| | | | | |
|---|---|---|---|---|
| 4,175,832 A | * | 11/1979 | Umeki | G11B 7/0925 359/876 |
| 4,714,214 A | * | 12/1987 | Schleimann-Jensen | F41G 7/2213 359/872 |
| 5,430,571 A | * | 7/1995 | Witteveen | G02B 5/09 250/236 |
| 5,959,758 A | * | 9/1999 | Seo | G02B 26/105 359/872 |
| 6,249,367 B1 | * | 6/2001 | Hirose | G02B 26/0808 359/872 |

(Continued)

FOREIGN PATENT DOCUMENTS

| | | |
|---|---|---|
| DE | 102016224979 A1 | 6/2018 |
| EP | 1571482 A1 | 9/2005 |

(Continued)

OTHER PUBLICATIONS

"International Search Report and Written Opinion Issued in PCT Application No. PCT/US20/054884", dated Feb. 17, 2021, 13 Pages.

*Primary Examiner* — Nicholas R. Pasko
(74) *Attorney, Agent, or Firm* — Rainier Patents, P.S.

(57) ABSTRACT

This document relates to an optical device that uses a mirror scanning system as part of a display engine, where images generated by the mirror scanning system can be propagated through a waveguide or other such optical assembly to a user's eye. The mirror scanning system can utilize a magnetic assembly, where the mirror of the scanning system can be held in place magnetically instead of using support structures such as torsion bars or beams. Actuators can then be actuated to control the tilt of the mirror by way of magnetic fields, providing a greater field of movement for the optical element and enabling a spherical scan area to be produced.

20 Claims, 13 Drawing Sheets

(56) References Cited

U.S. PATENT DOCUMENTS

| | | | |
|---|---|---|---|
| 7,116,017 B2 * | 10/2006 | Ji | ............................ H02K 33/16 |
| | | | 335/223 |
| 7,643,196 B2 * | 1/2010 | Bernstein | .............. G02B 26/085 |
| | | | 359/200.7 |
| 8,035,876 B2 | 10/2011 | Bernstein et al. | |
| 9,304,305 B1 | 4/2016 | Paul et al. | |
| 2008/0310001 A1 | 12/2008 | Bernstein | |
| 2015/0277123 A1 | 10/2015 | Chaum et al. | |
| 2016/0140887 A1 | 5/2016 | Kim | |
| 2017/0351088 A1 * | 12/2017 | Aoyagi | ................. G02B 7/1821 |
| 2018/0130391 A1 | 5/2018 | Bohn | |
| 2018/0267149 A1 | 9/2018 | Polonsky et al. | |
| 2018/0267294 A1 * | 9/2018 | Aschwanden | ....... G02B 26/101 |

FOREIGN PATENT DOCUMENTS

| | | | |
|---|---|---|---|
| RU | 2666224 C1 | 9/2018 | |
| WO | WO-2007145236 A1 * | 12/2007 | ........... G02B 26/105 |
| WO | 2018138349 A2 | 8/2018 | |

* cited by examiner

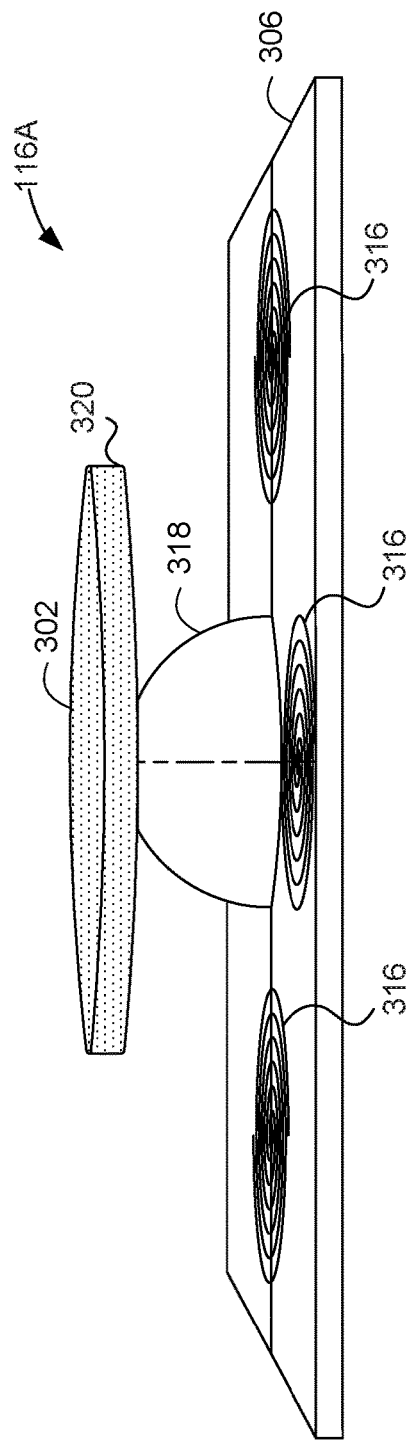
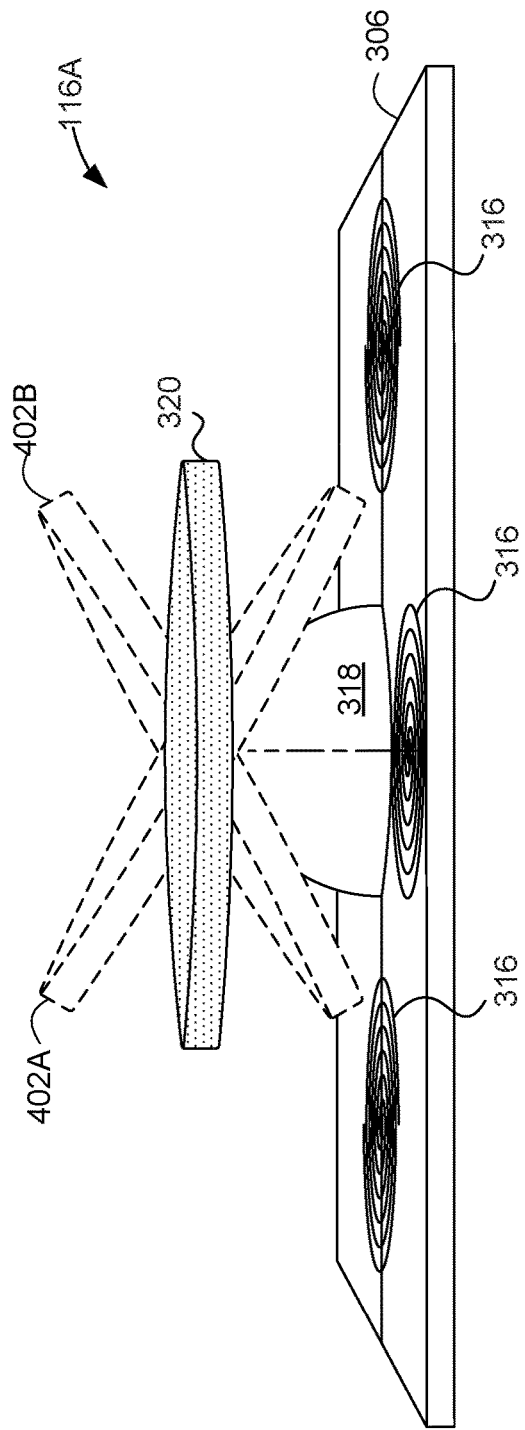

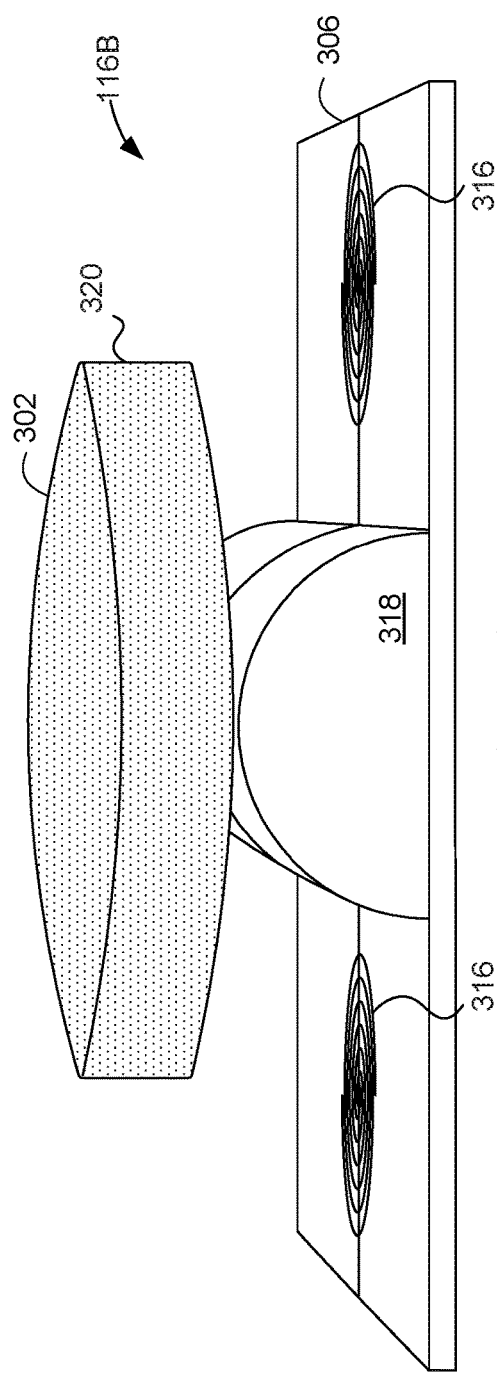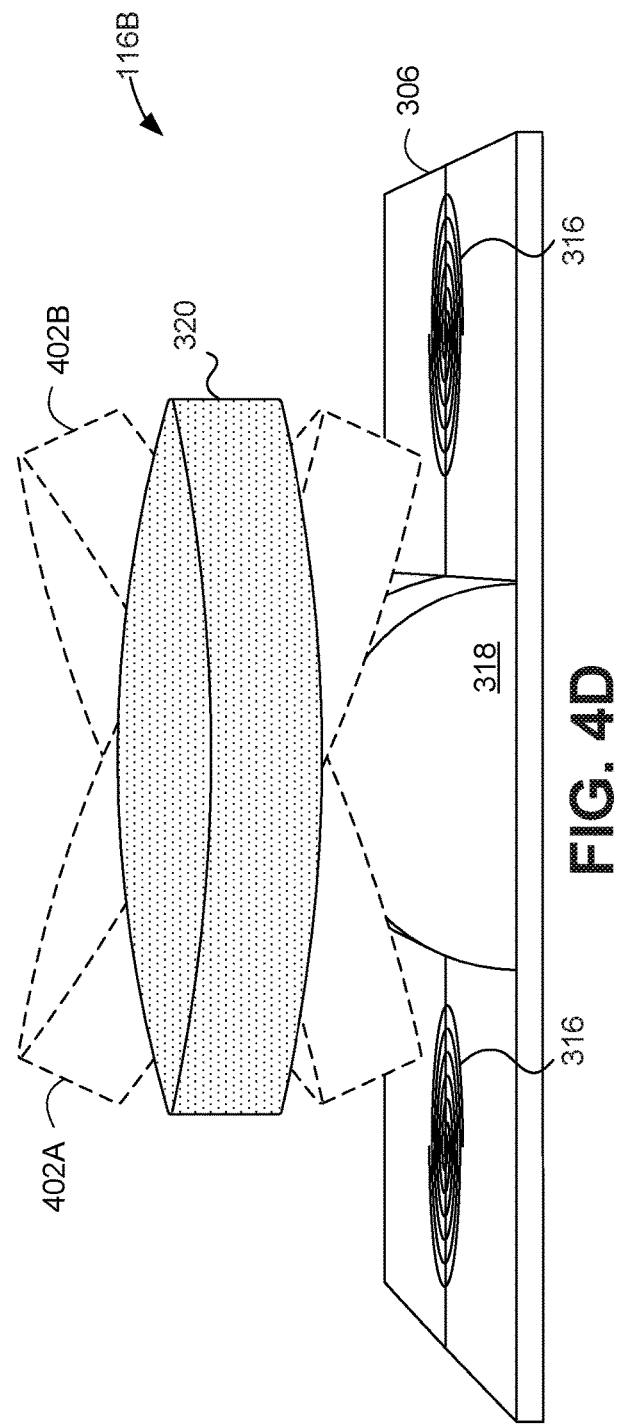

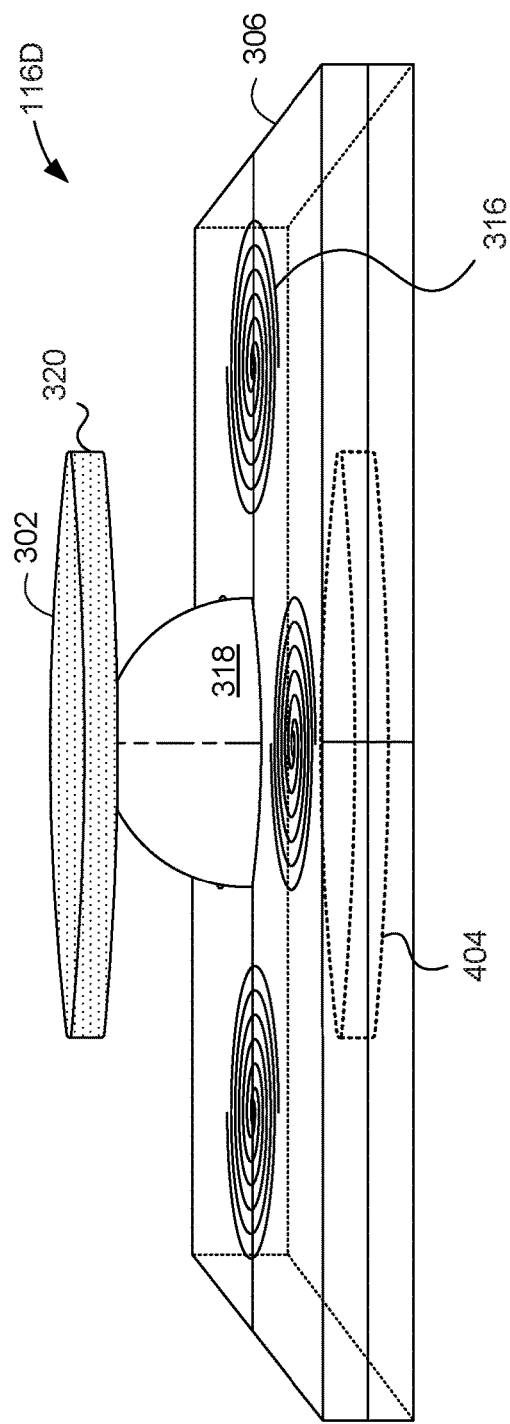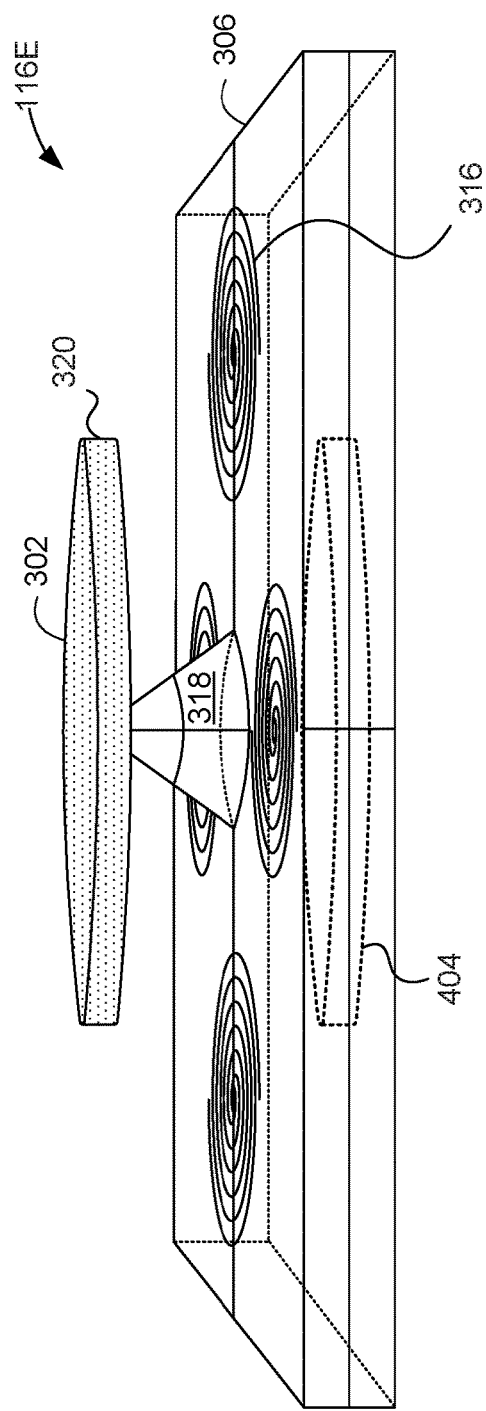

MAGNETIC SEESAW SCANNER

BACKGROUND

Display technology is advancing in the areas of augmented reality (AR) and virtual reality (VR) to provide users with more immersive visual experiences. For example, in some AR applications, generated imagery can be displayed to a user via a transparent display that also allows the user to view the surrounding physical environment. The generated imagery enhances or augments the user's experience or knowledge of the surrounding physical environment.

In some implementations a display system may generate an image that can be spatially propagated from one position to another position in an optical system, typically through an optical waveguide. For example, in a near-eye display (NED) device, an optical waveguide made of a substrate can spatially translate propagating light waves representing imagery generated by a display engine and convey them along an optical path toward one or both eyes of a user. Such technology may be incorporated into an NED device in the form of eyeglasses, goggles, a helmet, a visor, or some other type of head-mounted display (HMD) device or eyewear.

However, for typical NED devices, reproduction of an image having a wide field of view (FOV) can be difficult, as existing display system technologies utilized in the NED devices are limited in their range of motion, thus causing the resulting generated image to be limited in its FOV. Moreover, existing display system technologies may be limited in their axes of motion, resulting in an unrealistic image. As such, there remain difficulties in generating a wide FOV image that can produce a realistic augmented experience for a user of the NED device.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

DETAILED DESCRIPTION

Overview

Figure 1:
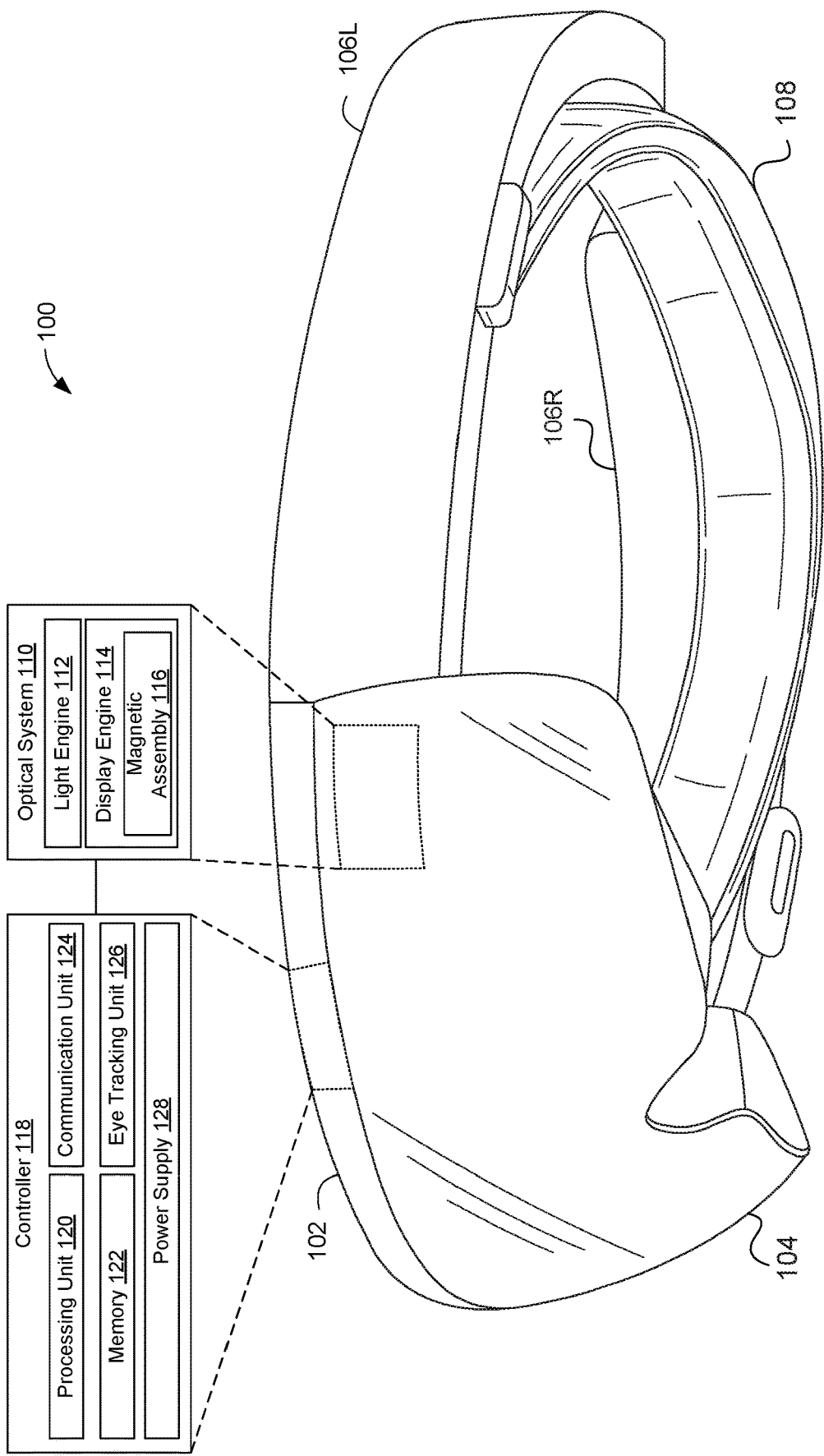
FIGS. 1, 2A, and 2B illustrate an example device that is consistent with some implementations of the present concepts.

Certain NED devices, such as HMD devices, can include optical systems for spatially translating a generated image from one position to another position, for example from a light engine to an eye of a user. Such optical systems can include one or more transparent waveguides arranged so that they are located directly in front of each eye of the user when the NED device is worn by the user, to project light representing generated images into the eye of the user. In NED devices that utilize these waveguides, light can propagate through the waveguides over certain internal angles. Light propagating at some non-zero angle of incidence to a surface of the waveguide can travel within the waveguide via a transmissive substrate, bouncing back and forth between the surfaces via total internal reflection (TIR). With such a configuration, images generated by the NED device can be overlaid on the user's view of the surrounding physical environment.

One aspect of translating a generated image from one position to another involves the use of a scanning display system that can scan light from a light source and perform reflection of the light about two orthogonal axes in order to "paint" an image based on the light source. In some implementations, this can be performed by use of a display engine that can include a microelectromechanical systems (MEMS)-based scanning system, which can generate a two-dimensional raster scan image pixel by pixel for each image frame. Light emitted from a light engine can be synchronized with biaxial MEMS mirror drive actuators which may rotate a mirror system in horizontal and vertical directions to produce viewable images in a two-dimensional FOV.

The mirror system may include a single mirror that can be driven in both horizontal and vertical directions, or may include two mirrors driven separately in horizontal or vertical directions. In a two-mirror system, for example, a horizontally scanned mirror may be driven at a relatively fast rate (e.g., approximately 10 kHz), whereas a vertically scanned mirror may be driven at a relatively slower rate (e.g., approximately 60 Hz). The horizontal and vertical scan rates may at least partially determine the resolution of images generated at these rates, along with other factors such as mirror aperture and/or scan angle. That is, the biaxial range of motion of the MEMS mirror can establish the size of the FOV that the scanning system can generate.

In typical display engines, the MEMS mirror can be supported by torsion bars that may be used to pivot the mirror in the bi-axel directions necessary to generate the image. However, the use of torsion bars to secure the mirror can restrict potential movement of the mirror, and create undesirable stresses on the overall scanning system, which may ultimately result in more rapid wear and breakdown of the system. Furthermore, biaxial scanning systems typically produce roughly rectangular scanning images, and as such, spherical scanning images can be difficult to create in these types of scanning systems.

Additionally, typical display engines may produce images for propagation to a user's eye that maintains a common resolution across the entire image. However, as the human eye is much more accurate in the middle of the eye's field of vision than on the periphery of the eye's field of view, system processing requirements can be reduced by providing a scanning system that creates a higher resolution area focused in the center of the image, with lower resolution on the outer edges of the image. Because only a portion of the generated image is high resolution, data transfer and power usage needs can be reduced for the device.

Furthermore, this high-resolution portion of the image may be movable based on data received from, for example, an eye tracking component of the NED device. For example, the eye tracking component can track a user's eye movement, and the display engine can be configured to appropriately change the resolution of the portion of the image where the user's eye is currently directed.

Accordingly, implementations disclosed herein are directed to scanning systems that can include a magnetic assembly for securing the MEMS mirror. In particular, a permanent magnetic element can support an optical element, such as a mirrored surface, and the magnetic element can be held in place against a base through magnetic force, rather than using flexors. Because the magnetic element is magnetically secured, actuators can be used to manipulate the magnetic element, and therefore the mirror, to create a light beam steering device that can tilt the mirror to any angle. This configuration can provide a greater range of movement than mirror systems that utilize torsion bars to secure the mirror.

Alternatively, or additionally, other implementations can be directed to display systems that can utilize a permanent magnetic element, such as a ball or cylinder. The magnetic element can have a flat surface or plurality of flat surfaces that can act as mirror surfaces, such as by securing optical elements to all of or a subset portion of the plurality of flat surfaces. Thus, the final shape of the magnetic element can also be something between a ball and a polyhedron, or in the case that the magnetic element is a cylinder, the shape can be anything between a cylinder and a bar with a polygonal cross-section or plurality of polygonal cross-sections. Furthermore, the magnetic element can be positioned within an enclosure surrounded by electromagnetic coils, and the activation of the coils can be controlled to tilt the magnetic element to any angle for purposes of providing the uniaxial or biaxial range of motion for the mirror.

EXAMPLE DEVICE

FIG. 1 depicts an example NED device 100 which can implement the present concepts. The NED device 100 may provide VR and/or AR display modes for a user, i.e., the wearer of the device. To facilitate description, it is henceforth assumed that the NED device 100 is an HMD device designed for AR visualization.

As depicted in FIG. 1, NED device 100 can include a chassis 102, along with a protective visor 104, left side arm 106L, and right side arm 106R, which all may be mounted to chassis 102. Visor 104 may be a transparent material that can form a protective enclosure for various display elements coupled to the visor that are discussed below. Chassis 102 may provide a mounting structure for visor 104 and side arms 106L and 106R, and may be further connected to an adjustable headband 108 that enables wearing of NED device 100 on a user's head. An optical system 110 mounted to chassis 102 and enclosed within protective visor 104 can generate images for AR visualization, and is described in greater detail below.

In one implementation, optical system 110 may include a light engine 112, which may generate light waves representing the image for displaying via NED device 100. Light engine 112 may be any sort of device capable of emitting light, such as one or more light emitting diodes or laser diodes. Optical system 110 may also include a display engine 114 for consolidating light waves generated by light engine 112 and directing the light waves as appropriate. In one implementation, display engine 114 may be a MEMS-based scanning system (shown in FIG. 3) that can utilize an optical element capable of deflection about two orthogonal axes, or in some implementations, can utilize multiple optical elements that deflect on only one axis to provide additional functionality.

For example, in one implantation, there may be a combination of biaxial and uniaxial optical elements that can be used to produce a non-uniform image that can be used for AR visualization, and the non-uniform image may have portions of higher resolution that can follow the position of the user's eye. That is, a horizontally fast scanning mirror system could be combined with a biaxial slow scanning mirror, which can be biased to follow the eye while scanning the vertical axis. In certain instances, such implementations may require a second display engine that can be used to generate the lower resolution portions of the image, where the image generated by the second display engine can be combined with the high-resolution image. Alternatively, the position of an image from another kind of microdisplay device (e.g. OLED, MicroLED, LCOS, DLP, or a combination of thereof) could be further axially rotated with a suitable lens system and the biaxial slow scanning mirror.

In one implementation, the optical element may be a reflective mirror. Display engine 114 may include a magnetic assembly 116, which may be utilized to control positioning of the optical element to enable movement of the optical element to enable proper deflection of the light received from light engine 112, in order to properly generate the two-dimensional raster image.

Protective visor 104 and/or chassis 102 may also house controller 118, which may include various components for providing functionality to NED device 100. In one implementation, controller 118 may include various components such as a processing unit 120, a memory 122 accessible to the processing unit 120 for storing processor readable instructions and data, and a communication unit 124 communicatively coupled to the processing unit 120 which can act as a network interface for connecting the NED device to another computer system. Controller 118 may provide commands and instructions to optical system 110 for generating images for AR visualization, and in some implementations, can also receive eye tracking information that can be used by processing unit 120 to perform foveated rendering of images. Such eye tracking information can be provided from an eye tracking unit 126.

Processing unit 120 may include one or more processors including a central processing unit (CPU) and/or a graphics processing unit (GPU). Memory 122 can be a computer-readable storage media that may store instructions for execution by processing unit 120, to provide various functionality to NED device 100. Finally, a power supply 128 can provide power for the components of controller 118 and the other components of NED device 100, such as optical system 110 and additional components that may be included in NED device 100, such as image capture devices (e.g. cameras), audio devices (e.g. microphones and speakers), and location/motion capture devices (e.g. accelerometers).

Figure 2A:
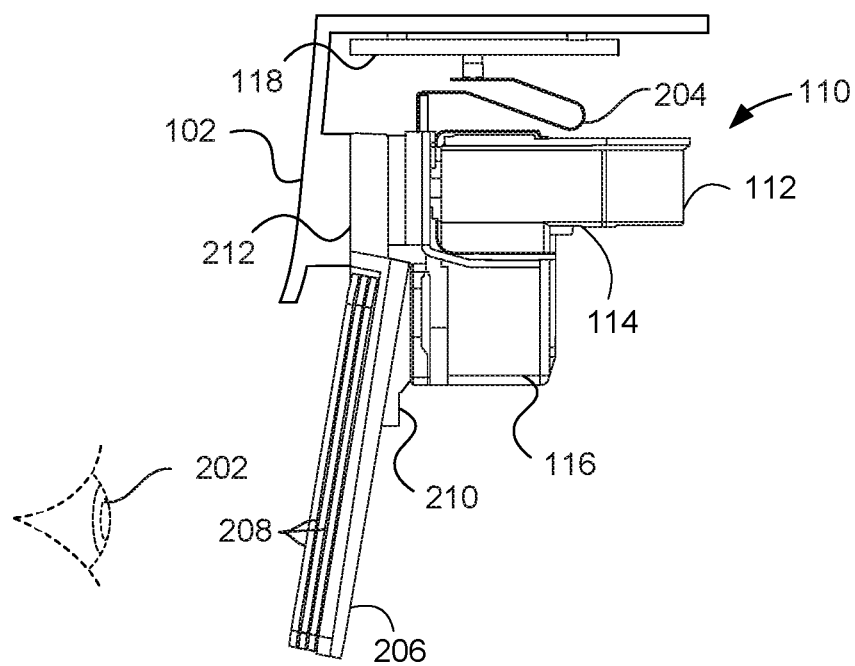
Figure 2B:
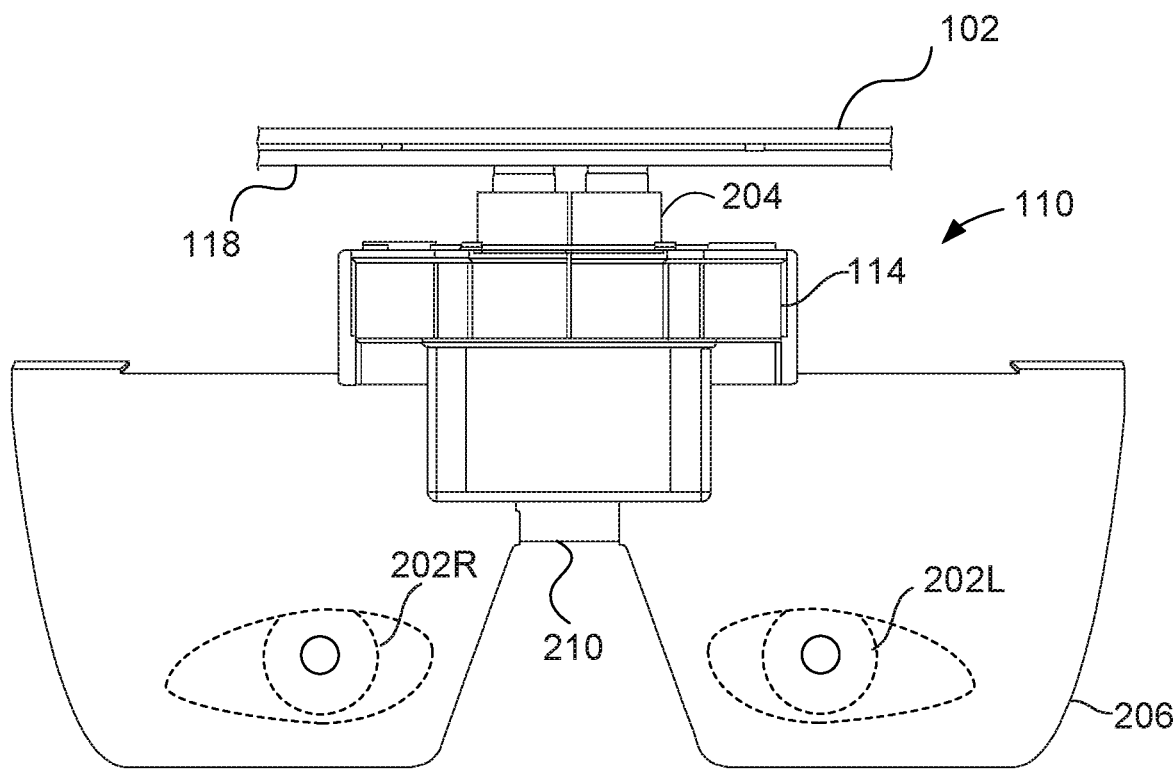

FIGS. 2A and 2B depict, in accordance with certain implementations, right side and front orthogonal views, respectively, of aspects that may be part of optical system 110 and may be contained within protective visor 104 of NED device 100 for propagation of imagery toward a user's eye 202. During operation of NED device 100, the display components can be positioned relative to the user's left eye 202L and right eye 202R as shown. The display components can be mounted to an interior surface of the chassis 102, which is shown in cross-section in FIG. 2A.

The display components can be designed to overlay three-dimensional images on the user's view of his real-world environment, e.g., by projecting light into the user's eyes. Light waves from light engine 112 may be directed by way of display engine 114 utilizing magnetic assembly 116, such that the light can be projected into the user's eyes. Furthermore, optical system 110 may be connected via a flexible circuit connector 204 to controller 118 for controlling the generation of light waves. For example, controller 118 may issue instructions to optical system 110 to create a foveated image that follows the user's eye movement, using eye tracking information provided by eye tracking unit 126.

The display components can further include a waveguide carrier 206 to which optical system 110 can be mounted. Waveguide carrier 206 may include one or more waveguides 208 stacked on the user's side of the waveguide carrier 206, for each of the left eye and right eye of the user. The waveguide carrier 206 may have a central nose bridge portion 210, from which its left and right waveguide mounting surfaces can extend. One or more waveguides 208 can be stacked on each of the left and right waveguide mounting surfaces of the waveguide carrier 206, for receiving light emitted from light engine 112 and steered by display engine 114. The waveguides 208 can project such light into user's left eye 202L and right eye 202R of the user. Optical system 110 can be mounted to chassis 102 through a center tab 212 located at the top of waveguide carrier 206 over the central nose bridge portion 210.

Figure 3A:
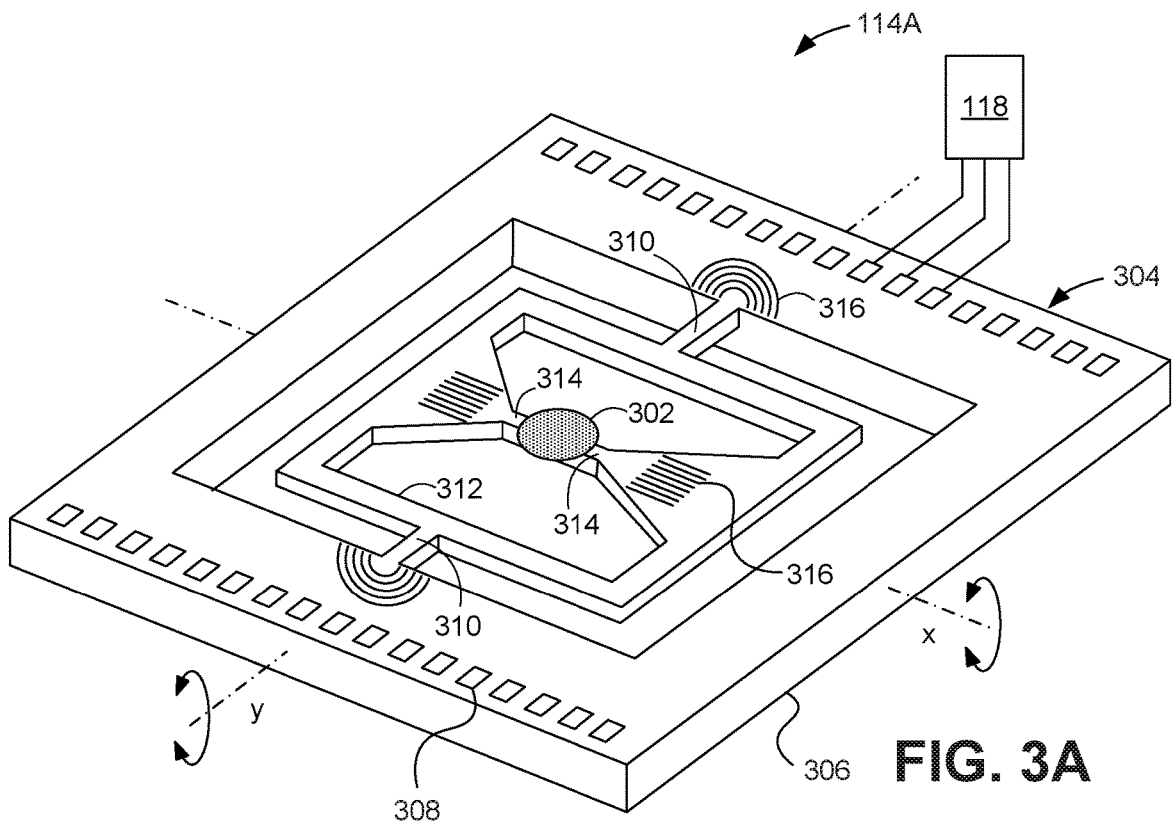
FIGS. 3A-6C illustrate example mirror scanning systems that are consistent with some implementations of the present concepts.

FIG. 3A depicts an example display engine 114A. As discussed above, display engine 114A may be a MEMS scanning system that may utilize an optical element 302 to perform biaxial deflection of light. In certain implementations, optical element 302 may be a mirror formed of any suitable specular reflector that can reflect light. The reflective surface of optical element 302 may be planar, or in certain implementations, may be convex or concave. Display engine 114A may be photolithographically formed in a substrate 304 using MEMS micromachining and semiconductor fabrication techniques.

The substrate 304, such as silicon may be fabricated to include a frame 306 having electrical contacts 308. The number and arrangement of electrical contacts 308 is shown by way of example only, and may vary in certain implementations. The substrate may be etched or otherwise photolithographically developed to define a first pair of torsion bars 310 enabling pivoting of a securing frame 312 about the y-axis with respect to the frame 306. The substrate may also be etched or otherwise photolithographically developed to define a second pair of torsion bars 314 enabling pivoting of the optical element 302 about the x-axis with respect to the securing frame 312. In certain implementations, torsion bars 310 and/or 314 can be flexures that are capable of twisting or flexing to provide tilting or steering movement to securing frame 312 and/or optical element 302.

Controller 118 may provide instructions to display engine 114A via one or more of electrical contacts 308. However, it is understood that display engine 114A may be electrically coupled to controller 118 by a variety of other means. Display engine 114A may further include actuators 316, which may be driven by controller 118. Actuators 316 can be configured to deflect optical element 302 about the x and y rotational axes, respectively. As depicted, a single optical element 302 situated on a dual-axis mount can be deflected about orthogonal rotational axes. In other implementations, the same effect can be achieved using two optical elements 302 arranged in series, where each optical element 302 can be situated on a single-axis mount.

Actuators 316 may operate according to a variety of technologies to cause pivoting of optical element 302 at the torsion bars 310 and/or 314. For example, actuators 316 may for example be piezoelectric, electromagnetic, or electrostatic transducers. Controller 118 can be configured to apply a drive signal (voltage or current) to each of the actuators to thereby provide the desired deflection of optical element 302 about the x and y axes. The amount of force applied by the actuators can be adjusted, thereby adjusting the tension in torsion bars 310 and/or 314, which can thereby adjust the resonant frequency of optical element 302. However, the use of torsion bars 310 and 314 reduces the movement range of optical element 302, and a large amount of force applied by the actuators to the torsion bars can result in excessive strain placed on the torsion bars.

Figure 3B:
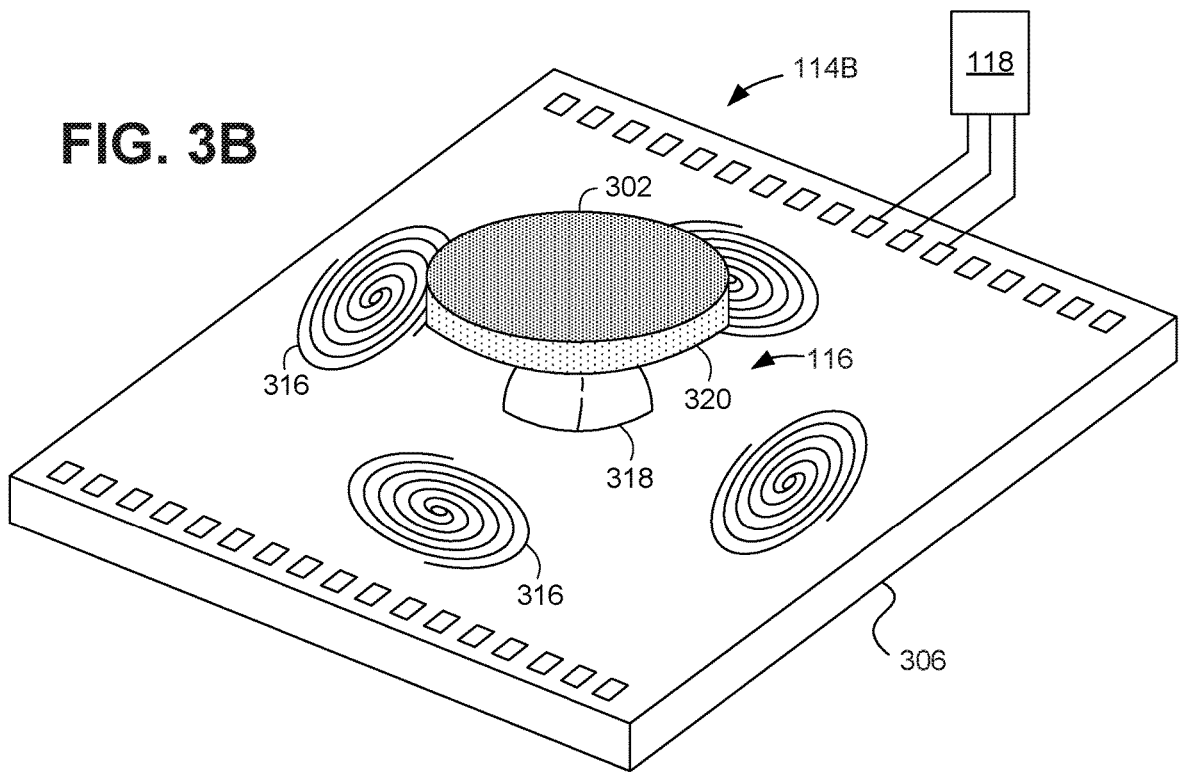

FIG. 3B depicts an example display engine 114B that can provide similar functionality to display engine 114A, but can avoid the use of torsion bars and enable a wide range of movement of the optical element. As depicted in FIG. 3B, display engine 114B can include a magnetic assembly 116 that can be used to provide the desired deflection of optical element 302 about the x and y axes. In particular, magnetic assembly 116 can be used to replace the joining of optical element 302 to frame 306 by way of torsion bars. Rather, a base 318, which in some implementations can be a permanent magnetic base, can be affixed directly to frame 306, and a permanent magnetic element 320 can be secured to the base through magnetic force. Furthermore, optical element 302 can be positioned over magnetic element 320, such as by being affixed to the magnetic element. Upon receiving commands from controller 118, actuators 316 may be used to deflect magnetic element 320 (and therefore optical element 302) in a biaxial motion about base 318 by applying varying degrees of magnetic force among the actuators, thereby controlling the tilt of magnetic element 320 by magnetically interacting with the magnetic element.

This can enable optical element 302 to be positioned anywhere on the surface of base 318, providing a wider range of tilting motion than what can be achieved by way of display engine 114A. Thus, the use of magnetic assembly 116 can provide a display engine that can produce a wider range of motion than typical display engines. Furthermore, magnetic assembly 116 can be used to provide a more spherical or elliptical FOV image rather than the roughly rectangular scan image that is produced by more typical display engines, as the optical element can be positioned in a large degree of angles for purposes of reflecting light from light engine 112. Additionally, in certain implementations, magnetic assembly 116 can be used to translate the position of an otherwise generated spherical or elliptical FOV image to be centered to the user's central vision based at least on the user's eye positions as defined by eye tracking unit 126. The following paragraphs provide a more detailed discussion regarding example implementations of magnetic assembly 116.

Example Magnetic Assemblies

Figure 4E:
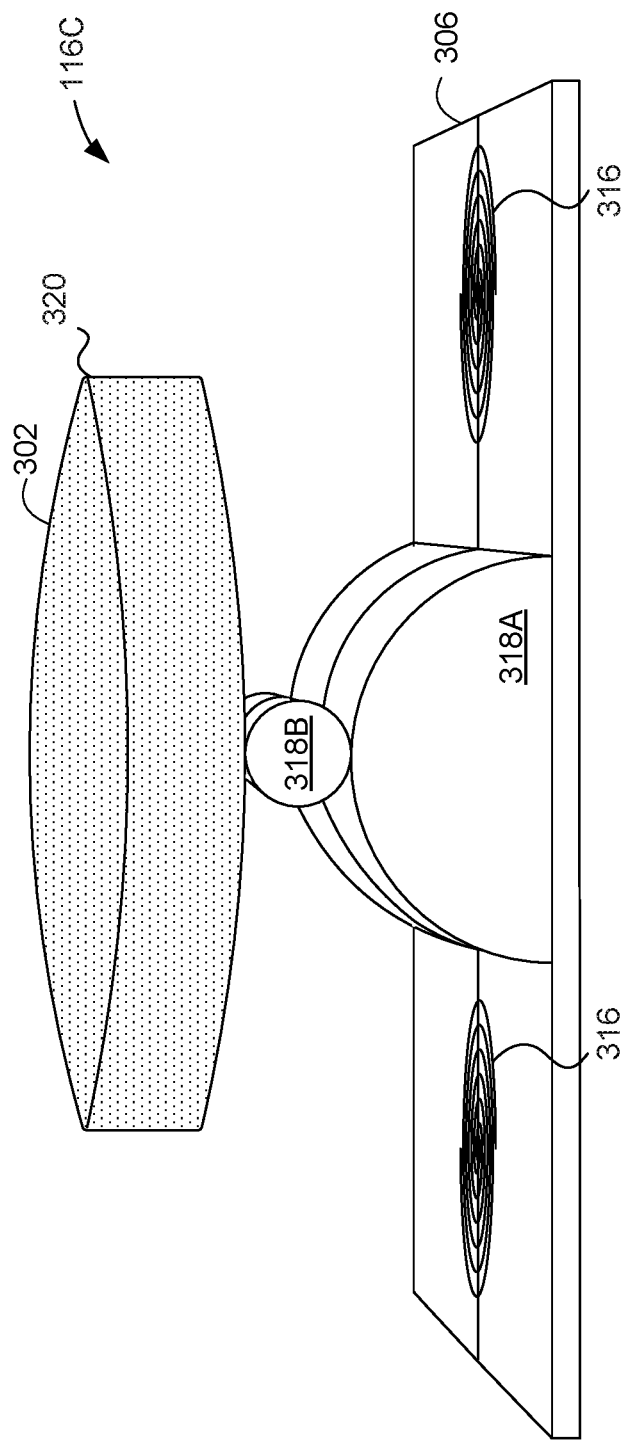

FIGS. 4A-4H and 5A-5C collectively depict example implementations of magnetic assembly 116 that can be used by NED device 100. As depicted in FIG. 4A, magnetic assembly 116A may include a frame 306, and a plurality of actuators 316 may be positioned relative to frame 306. For example, actuators 316 may be positioned on top of frame 306, or may be disposed within frame 306. In certain implementations, actuators 316 may be electromagnetic coils, however, it is to be appreciated that other types of magnetic actuators may be used. Furthermore, in certain implementations, three or four (or more) actuators may be disposed in connection with frame 306.

A base 318 may be a permanent magnet that can be fixed on top of frame 306, and in certain implementations, may be a magnetic half-sphere that has a magnetic pole at the top of the sphere. However, it is to be appreciated that other shapes can be utilized for base 318, examples of which will be described in subsequent figures. A magnetic element 320, which also may be a permanent magnet, can then be attached to base 318 and held in place by magnetism, such that magnetic element 320 can be centered on the top of base 318 at a pivot position. A top surface of magnetic element 320 can be fashioned with an optical element 302, which may be a reflective surface such as a mirror that can reflect light emitted from light engine 112. In certain implementations, magnetic element 320 may be a magnetic disc, however, it is to be appreciated that other shapes can be utilized for magnetic element 320, examples of which will be described in subsequent figures. Thus, magnetic element 320 (and therefore optical element 302) can be held in place though magnetism without the need to utilize torsion bars.

Based at least on the positioning of magnetic element 320 on base 318, actuators 316 may be individually actuated, or actuated in combination with other actuators, in order to generate appropriate magnetic fields such that the tilt of magnetic element 320 can be adjusted. As such, biaxial tilting of optical element 302 can be achieved by varying the amount of force applied by actuators 316, and the positioning of magnetic element 320 on base 318 can be directly controlled by way of drive activator instructions that may be issued by, for example, controller 118.

FIG. 4B depicts example tilting motions that can be achieved using magnetic assembly 116A. As depicted in FIG. 4B, magnetic element 320 can be tilted atop base 318, such as to achieve tilt angle 402A upon actuation of certain of actuators 316, or to achieve tilt angle 402B upon actuation of certain of actuators 316. It is to be appreciated that tilt angles 402A and 402B are only examples, and a wide range of biaxial motions can be achieved based at least on the actuation of certain of actuators 316.

FIG. 4C depicts an alternate magnetic assembly 116B, which can be utilized to provide movement about a single axis. As depicted in FIG. 4C, base 318 may be a magnetic half cylinder, having magnetic poles at the cylinder ends. A magnetic element 320, such as a magnetic disc, can then be positioned on top of base 318, and the top of magnetic element 320 can have affixed thereto an optical element 302. As such, magnetic element 320 can stick to the center of the cylinder and can be held in place magnetically without the need to support structures such as torsion bars or beams. Similar to FIG. 4B, FIG. 4D depicts the various tilt angles that can be performed in response to actuation of actuators 316, where tilt angles 402A and 402B are example tilt angles that can be achieved by rotating magnetic element 320 over the top of base 318.

FIG. 4E depicts an alternate magnetic assembly 116C, which can be utilized to provide greater control over the resonant frequency exhibited by magnetic element 320 and subsequently optical element 302. As depicted in FIG. 4E, bases 318A and 318B can be magnetically attached to each other, for purposes of serving as base 318. In certain implementations, base 318A may be a permanent magnetic half-cylinder that is fixed to frame 306, while base 318B may be a permanent magnetic cylinder that is not fixed to frame 306. Base 318B can be magnetically held on top of base 318A, and magnetic element 320 can then be positioned on top of base 318B, with the top of magnetic element 320 having affixed thereto an optical element 302.

Upon actuation of actuators 316, both base 318B and magnetic element 320 may be influenced by the magnetic field, and may move in combination, such that base 318B moves across the surface of base 318A, and magnetic element tilts on the surface of base 318B. Due to the dual movement of both base 318B and magnetic element 320, the resonant frequency dynamics associated with optical element 302 can be changed.

FIG. 4F depicts an alternative magnetic assembly 116D, having a frame 306 where actuators 316 (only one of which is labelled for clarity purposes) may be fixed on top of frame 306, or alternatively disposed within frame 306. In contrast to the implementations shown in FIGS. 4A-4E, in magnetic assembly 116D, base 318 may be a non-magnetic base, such as a sphere, and magnetic element 320 containing optical element 302 may be held at a pivot point position on top of base 318 by a permanent magnetic securing element 404 that may be disposed within frame 306. In one implementation, securing element 404 can be a magnet, which exerts a magnetic force on magnetic element 320 to hold magnetic element 320 at a central pivot position on base 318.

It is to be appreciated that base 318 is not limited to a spherical structure, and can be any type of structure, such as a non-magnetic pyramid or a non-magnetic cone, as depicted in FIG. 4G, depicting an alternative magnetic assembly 116E utilizing a cone-shaped base 318, where magnetic element 320 can be positioned on a point of base 318.

Figure 4H:
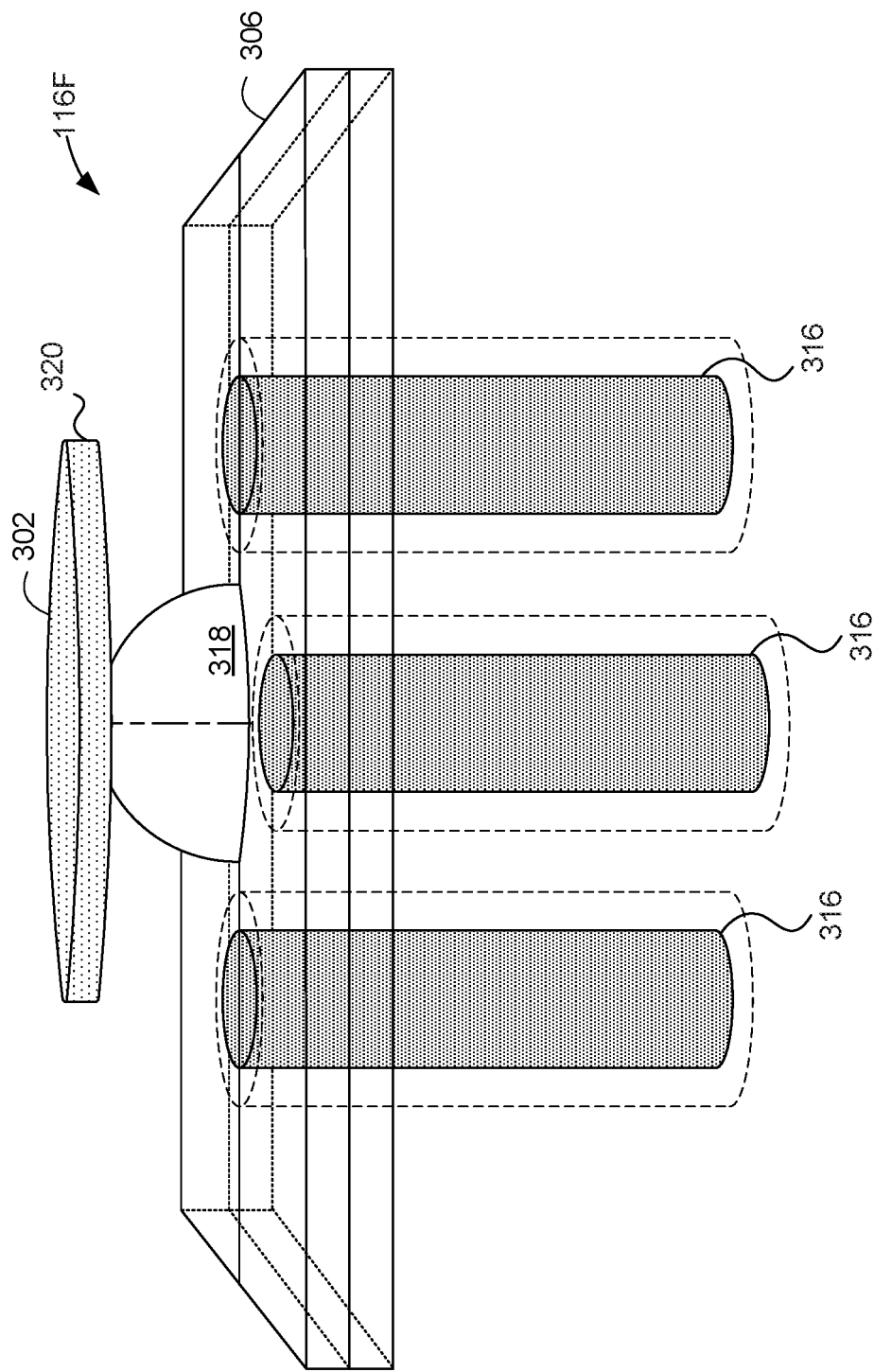

FIG. 4H depicts an alternative magnetic assembly 116F, having a frame 306 where actuators 316 may be disposed within frame 306. In magnetic assembly 116D, actuators 316 may be permanently magnetic biased cores of electromagnetic coils, and can provide varying degrees of magnetic force to magnetic element 320. Thus, magnetic element 320 and subsequently optical element 302 can be secured atop base 318, which may be a non-magnetic base, such as a sphere, a cone, or a pyramid. Thus, magnetic element 320 containing optical element 302 may be held at a pivot point position on top of base 318 by varying degrees of magnetic force applied by actuators 316 that can be disposed within frame 306.

Figure 5A:
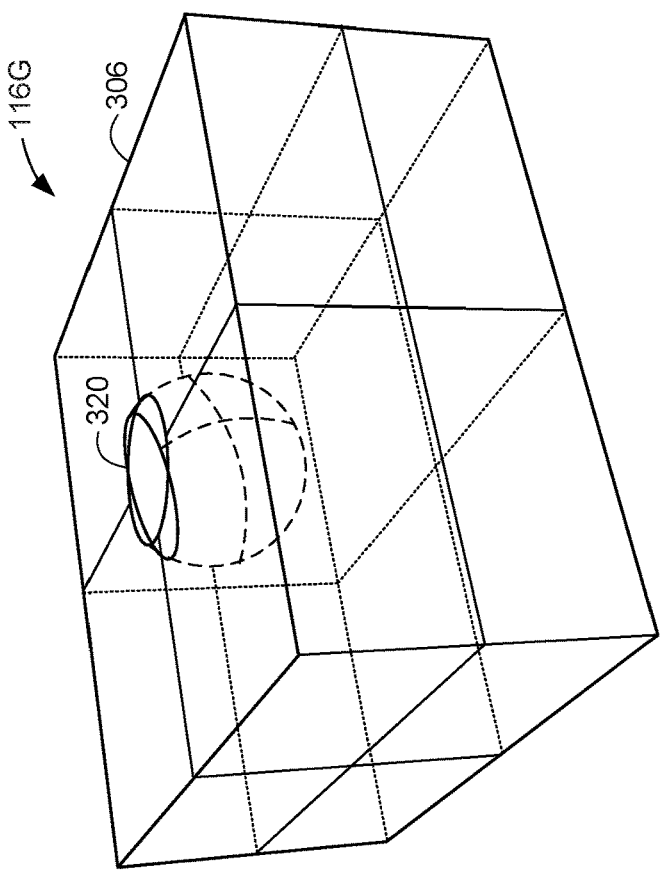

FIG. 5A depicts an alternative magnetic assembly 116G, having a frame 306 that can provide an enclosure for a magnetic element 320. In one implementation, magnetic element 320 may be a magnetic ball that is secured within a ball-shaped enclosure defined by frame 306, and may have a diameter between 1-10 millimeters, for example. Magnetic element 320 may include a flat surface of the element, which may be reflectively coated and serve as an optical element 302, which in some implementations may be a mirror. It is to be appreciated that magnetic element 320 is not limited to a magnetic ball, and may be a variety of shapes, as discussed in detail below with respect to FIGS. 6A-6C. By securing magnetic element 320 in an enclosure of frame 306, securing magnets (such as base 318 or securing element 404) can be eliminated, as magnetic element 320 can be secured within the enclosure of frame 306.

Figure 5B:
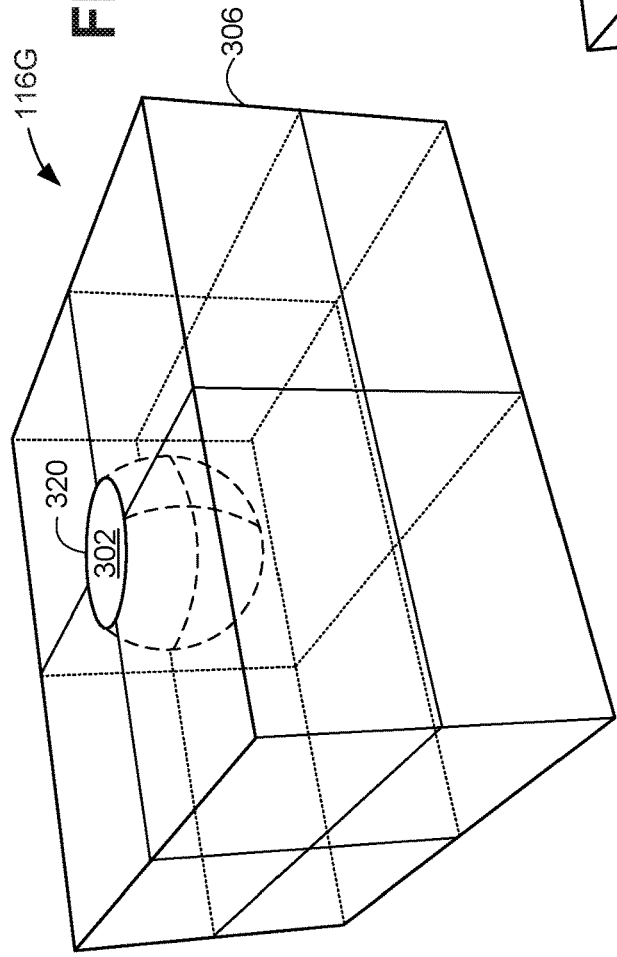

Frame 306 can be made up of a number of subframes, which in some implementations may be a multilayered printed circuit board (PCB). PCB stacks can be developed that would create an enclosure for securing magnetic element 320. Furthermore, frame 306 can have disposed within a number of actuators 316 (not shown in FIG. 5A for ease of viewing, but depicted in later figures), such as electromagnetic coils, that can be positioned in close proximity to magnetic element 320. For example, each PCB could have an actuator manufactured into the board, and when the PCB stack is used to create frame 306, the actuators can surround magnetic element 320 in a biaxial fashion. By actuation of the actuators disposed within frame 306, magnetic element 320 can spin within the enclosure of frame 306, as depicted in FIG. 5B. This design can allow the distance between the magnetic element 320 and the actuators 316 to be minimized, which may result in added efficiency in the magnetic assembly.

Figure 5C:
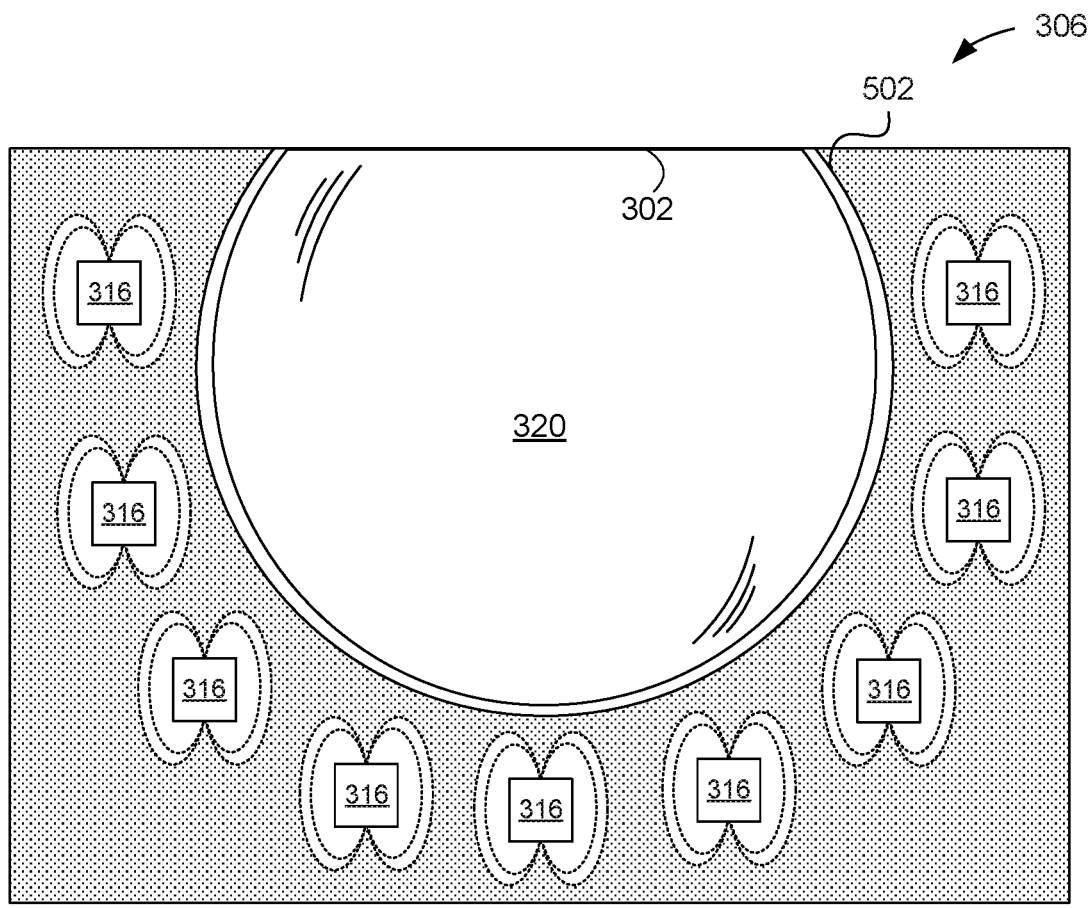

FIG. 5C depicts an example frame 306 that can be manufactured to provide an enclosure 502 for magnetic element 320. As depicted, magnetic element 320 may rest within enclosure 502, and may be capable of spinning within enclosure by known means of allowing a ball or other such shape to freely spin and rotate within an enclosure, such as by utilizing ball bearings (not shown) or by floating in a liquid. Frame 306 may have disposed within a plurality of actuators 316, which may be positioned at various points within frame 306 and surrounding enclosure 502. While FIG. 5C only depicts actuators on the x/y axes, it is to be appreciated that actuators may also extend into the z axis, thereby providing a full surrounding of enclosure 502 within frame 306. Consequently, actuators 316 may be actuated to enable biaxial spinning of magnetic element 320 within enclosure 502, allowing optical element 302 to be positioned as desired to ensure proper deflection of light from light engine 112.

Figure 5D:
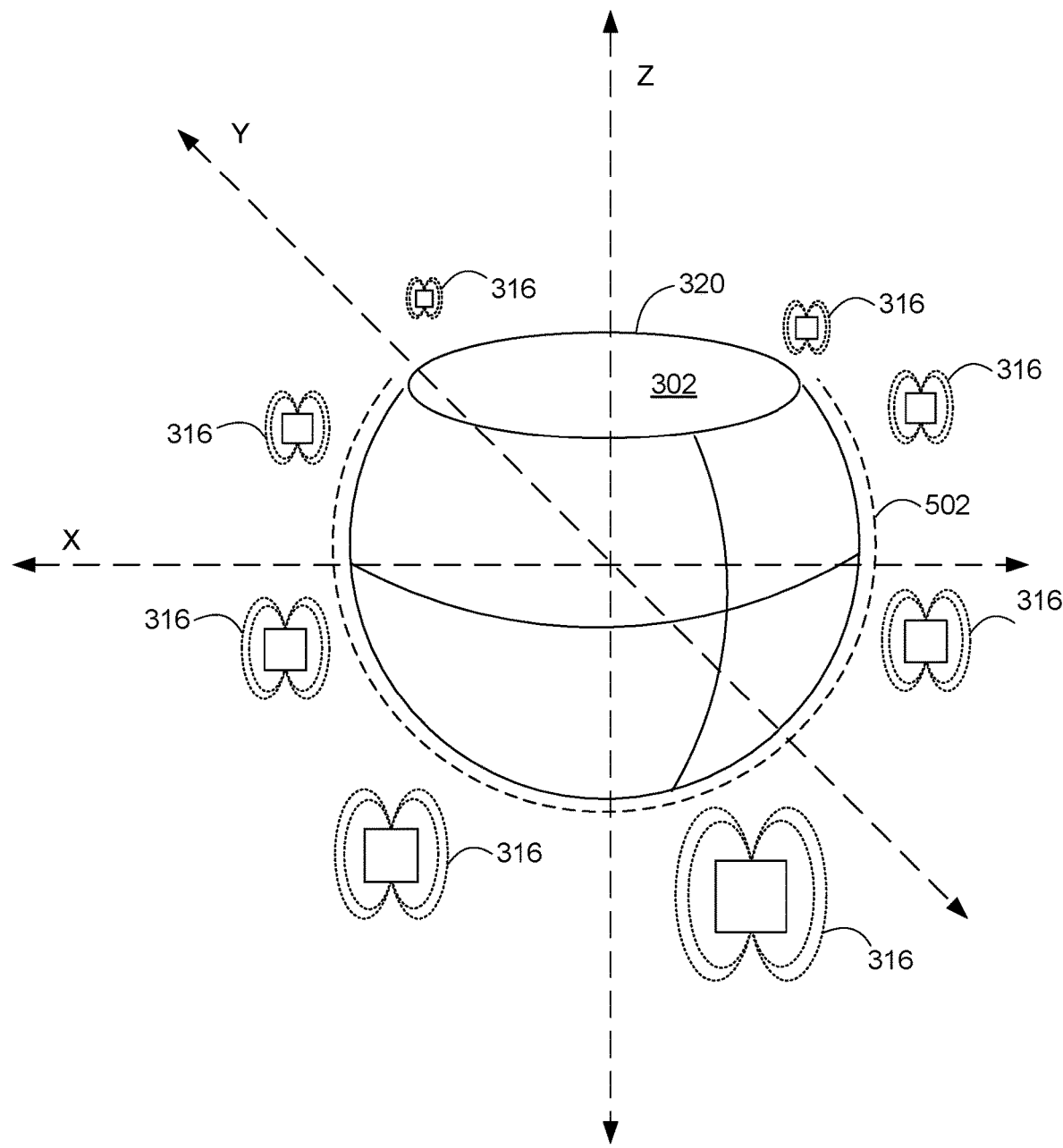

FIG. 5D depicts an alternate view of magnetic element 320 having optical element 302 on a flat surface of magnetic element 320. As noted in the discussion of FIG. 5C, enclosure 502 may surround magnetic element 320, and actuators 316 may surround enclosure 502 in all three dimensions. This is shown in FIG. 5D, where actuators 316 surround enclosure 502 and magnetic element 320, with certain actuators toward the front represented larger than actuators in the back, as they extend further down the z axis.

Figure 6A:
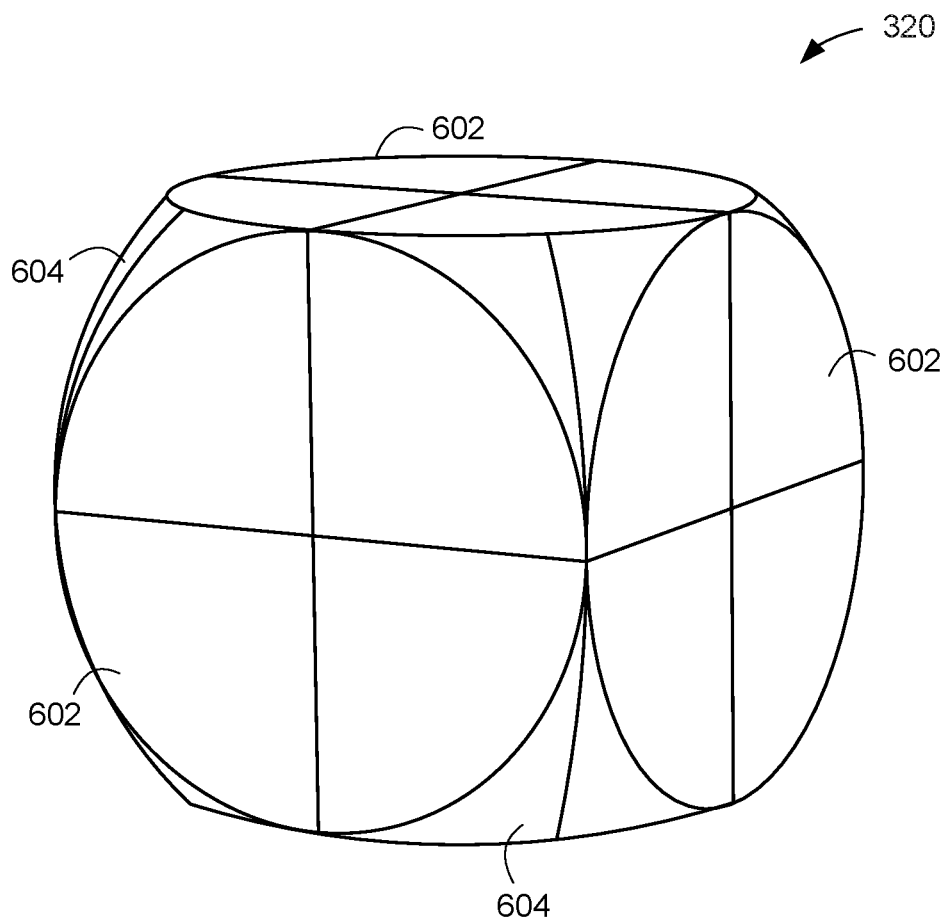

As noted above, in some implementations, magnetic element 320 is not limited to a ball-shape, and instead may be any shape having one or more flat surfaces, where the shape is capable of freely rotating inside an enclosure for uniaxial or biaxial motion. For example, magnetic element 320 may having a shape similar to a polyhedron, as depicted in FIG. 6A. That is, magnetic element 320 may have a plurality of flat surfaces 602, and a plurality of curved surfaces 604 that may allow the magnetic element to freely rotate within an enclosure.

Figure 6C:
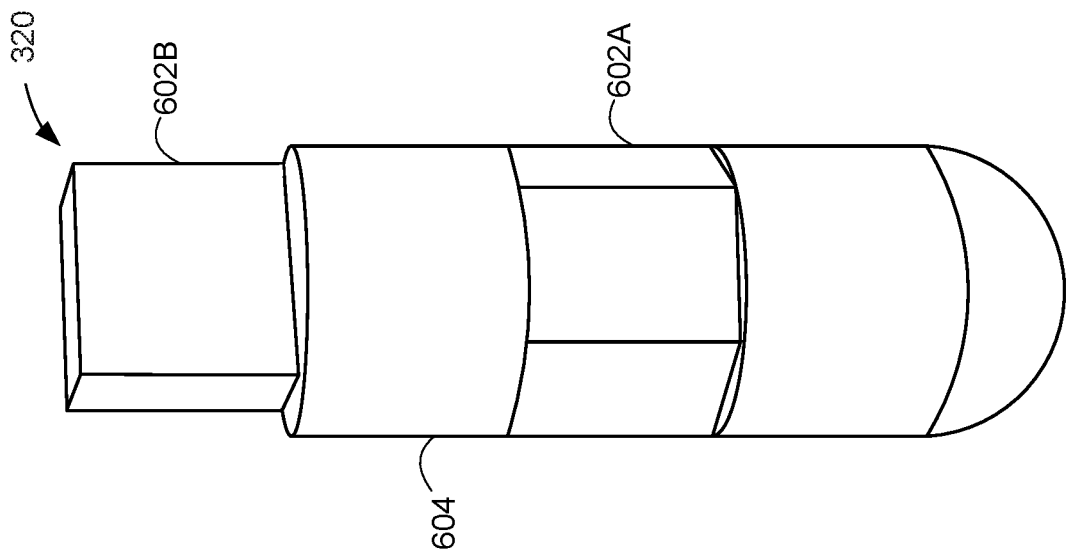
Figure 6B:
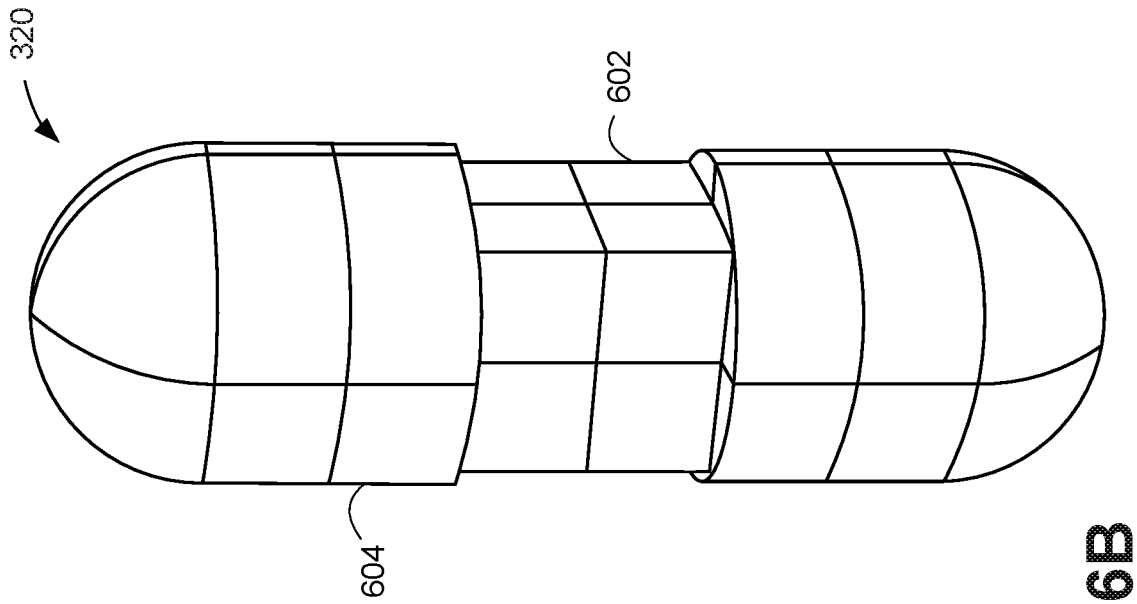

Alternatively, in some implementations, magnetic element 320 may be a cylinder, such as depicted in FIG. 6B, where the cylinder has flat surfaces 602 located at certain portions on the cylinder, while retaining curved surfaces 604 to allow the cylinder to freely rotate uniaxially within a cylindrical-shaped enclosure to tilt flat surfaces 602 into appropriate positions. Alternatively, as depicted in FIG. 6C, magnetic element 320 may have multiple portions of flat surfaces, such as flat surface 602A located at a middle portion, and flat surface 602B located at a distal end of magnetic element 320. Furthermore, flat surfaces 602A and 602B may be capable of freely rotating independently of one another, such as by locking and unlocking certain portions of magnetic element 320 from one another. Thus, display engine 114 may utilize optical elements associated with flat surfaces 602A or 602B, or both, depending on needs of the display engine. It is to be appreciated that a plurality of optical elements 302 would be secured on flat surfaces 602, but are not depicted in the FIGS. 6A-6C for clarity purposes.

It is to be appreciated that any of the preceding implementations can be utilized in combination with a second scanning system, such as a rotary fast scanner. That is, the magnetic assemblies disclosed herein can be used in place of a 1D/2D slow scanner, and a 1D/2D fast scanner may utilize a typical MEMS scanner that is used on combination with the magnetic assembly.

Furthermore, the use of a magnetic assembly as disclosed herein, when used in combination with an alternate scanning system, can provide eye tracking for the NED device. For example, an eye tracking component of the NED device (not depicted) can be used to track a user's eye, and the magnetic element can be adjusted to track the movement of the user's eye. This can be beneficial for allowing the introduction of foveation to the generated image. Because the NED device can determine where the user is looking, the device can provide higher resolution imagery at the center location of the user's vision, while requiring less pixel density on the outer sections of the image that correspond to the user's peripheral vision.

DEVICE IMPLEMENTATIONS

As noted above with respect to FIG. 1, NED device 100 may include several components and/or devices, including an optical system 110, and a controller 118. As also noted, not all device implementations can be illustrated, and other device implementations should be apparent to the skilled artisan from the description above and below.

The term "device", "computer," "computing device," "client device," "server," and or "server device" as possibly used herein can mean any type of device that has some amount of hardware processing capability and/or hardware storage/memory capability. Processing capability can be provided by one or more hardware processors (e.g., hardware processing units/cores) that can execute computer-readable instructions to provide functionality. Computer-readable instructions and/or data can be stored on persistent storage or volatile memory. The term "system" as used herein can refer to a single device, multiple devices, etc.

Memory 122 can be storage resources that are internal or external to any respective devices with which it is associated. Memory 122 can include any one or more of volatile or non-volatile memory, hard drives, flash storage devices, and/or optical storage devices (e.g., CDs, DVDs, etc.), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others, which may constitute memory 122.

In some cases, the devices are configured with a general-purpose hardware processor and storage resources. In other cases, a device can include a system on a chip (SOC) type design. In SOC design implementations, functionality provided by the device can be integrated on a single SOC or multiple coupled SOCs. One or more associated processors can be configured to coordinate with shared resources, such as memory, storage, etc., and/or one or more dedicated resources, such as hardware blocks configured to perform certain specific functionality. Thus, the term "processor," "hardware processor" or "hardware processing unit" as used herein can also refer to central processing units (CPUs), graphical processing units (GPUs), holographic processing units (HPUs), controllers, microcontrollers, processor cores, or other types of processing devices suitable for implementation both in conventional computing architectures as well as SOC designs.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In some configurations, any of the modules/code discussed herein can be implemented in software, hardware, and/or firmware. In any case, the modules/code can be provided during manufacture of the device or by an intermediary that prepares the device for sale to the end user. In other instances, the end user may install these modules/code later, such as by downloading executable code and installing the executable code on the corresponding device.

Also note that the components and/or devices described herein can function in a stand-alone or cooperative manner to implement the described techniques. For example, the methods described herein can be performed on a single computing device and/or distributed across multiple computing devices that communicate over one or more network(s). Without limitation, such one or more network(s) can include one or more local area networks (LANs), wide area networks (WANs), the Internet, and the like.

Various device examples are described above. Additional examples are described below. One example includes a device comprising a controller, a light source, and a display system comprising: a frame for securing a magnetic element, the magnetic element being secured without using torsion bars to connect the magnetic element to the frame, an optical element disposed over a surface of the magnetic element, and a plurality of actuators disposed on or within the frame, wherein actuation of the actuators by the controller adjusts a tilt of the optical element by magnetically interacting with the magnetic element to reflect light from the light source.

Another example can include any of the above and/or below examples where the actuators are electromagnetic coils.

Another example can include any of the above and/or below examples where the device further comprises a base fixed to the surface of the frame, wherein the magnetic element is magnetically secured to the base.

Another example can include any of the above and/or below examples where the base is a permanent magnetic base and the magnetic element is magnetically secured to a top of the base.

Another example can include any of the above and/or below examples where the permanent magnetic base is a half-sphere, half-cylinder, cone, or pyramid.

Another example can include any of the above and/or below examples where the base is a first permanent magnetic base, and a second permanent magnetic base is magnetically secured to a top of the first permanent magnetic base, and the magnetic element is magnetically secured to a top of the second permanent magnetic base.

Another example can include any of the above and/or below examples where the base is a non-magnetic base.

Another example can include any of the above and/or below examples where the frame has disposed within a permanent magnetic securing element that magnetically secures the magnetic element to the non-magnetic base.

Another example can include any of the above and/or below examples where the magnetic element is secured within an enclosure of the frame.

Another example can include any of the above and/or below examples where the actuators surround the enclosure of the frame.

Another example can include any of the above and/or below examples where the enclosure is a ball-shaped enclosure, and the magnetic element is a magnetic ball positioned within the ball-shaped enclosure.

Another example can include any of the above and/or below examples where the enclosure is a cylindrical-shaped enclosure, and the magnetic element is a magnetic cylinder positioned within the cylindrical-shaped enclosure.

Another example can include any of the above and/or below examples where the magnetic element has a plurality of flat surfaces.

Another example can include any of the above and/or below examples where the controller is configured to control actuation of the actuators to adjust a tilt of the magnetic element.

Another example can include any of the above and/or below examples where the tilt of the magnetic element is controlled to follow an eye position of a wearer of the device.

Another example can include any of the above and/or below examples where the frame is a multilayered printed circuit board, and the actuators are manufactured into the multilayered printed circuit board.

Another example includes a device comprising a controller and a display engine configured to direct light from a light engine to an optical waveguide for propagation through the device, the display engine including a magnetic assembly comprising: a frame defining an enclosure, a magnetic element secured within the enclosure, the magnetic element having at least one optical element secured to the magnetic element, and a plurality of actuators surrounding the enclosure, wherein actuation of the actuators by the controller causes the magnetic element to move magnetically within the enclosure for positioning the optical element to direct the light to the optical waveguide.

Another example can include any of the above and/or below examples where the magnetic element is a magnetic ball or cylinder.

Another example can include any of the above and/or below examples where the magnetic element has a plurality of flat surfaces, and the plurality of flat surfaces have a plurality of optical elements secured thereto.

Another example can include any of the above and/or below examples where movement of the magnetic element is controlled to follow an eye position of a wearer of the device.

Another example includes a device comprising a light engine configured to produce light waves corresponding to an image and a display engine configured to direct the light waves through at least one optical waveguide; the display engine including a magnetic assembly for deflecting the light waves and the magnetic assembly including at least one optical element affixed to a top of a magnetic element, the magnetic element being secured to a frame without using torsion bars.

Another example can include any of the above and/or below examples where the magnetic element is secured to the frame by being magnetically held in a pivot position over a base affixed to a top of the frame.

Another example can include any of the above and/or below examples where the base is a permanent magnetic base.

Another example can include any of the above and/or below examples where the permanent magnetic base is a half-sphere, half-cylinder, cone, or pyramid.

Another example can include any of the above and/or below examples where movement of the magnetic element is controlled to follow an eye position of a wearer of the device.

Another example includes a frame defining an enclosure, a magnetic element secured within the enclosure, the magnetic element having an optical element affixed to a top of the magnetic element, and a plurality of actuators surrounding the enclosure, where actuation of the actuators causes the magnetic element to move magnetically within the enclosure

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other features and acts that would be recognized by one skilled in the art are intended to be within the scope of the claims.

The invention claimed is:

1. A device comprising:
a controller;
a light source; and
a display system comprising:
 a magnet having a ball shape with a flat surface;
 a frame including a ball-shaped enclosure for enclosing the magnet, the magnet being secured to the frame within the ball-shaped enclosure without using torsion bars to connect the magnet to the frame;
 an optical element disposed over the flat surface of the magnet; and
 a plurality of actuators disposed on or within the frame, wherein actuation of the actuators by the controller adjusts a tilt of the optical element by magnetically interacting with the magnet to reflect light from the light source.

2. The device of claim 1, wherein the actuators surround the ball-shaped enclosure of the frame.

3. The device of claim 1, wherein the magnet is capable of moving within the ball-shaped enclosure by utilizing ball bearings or by floating in a liquid.

4. The device of claim 1, wherein the optical element includes a mirror.

5. The device of claim 1, wherein the actuators surround the ball-shaped enclosure in three dimensions.

6. The device of claim 1, wherein the actuators include electromagnetic coils.

7. The device of claim 1, wherein the light source is configured to produce light waves corresponding to a source image.

8. The device of claim 1, wherein the controller is configured to tilt the magnet by applying varying degrees of magnetic forces among the actuators.

9. The device of claim 1, wherein the controller is configured to tilt the optical element in a biaxial range of motion.

10. The device of claim 1, wherein the controller is configured to control the actuation of the actuators to adjust a tilt of the magnet.

11. The device of claim 10, wherein the controller is configured to tilt the magnet to follow an eye position of a wearer of the device.

12. The device of claim 1, wherein the magnet has a plurality of flat surfaces.

13. The device of claim 12, wherein the plurality of flat surfaces have a plurality of optical elements secured thereto.

14. The device of claim 1, wherein the display system is configured to direct the light from the light source to an optical waveguide for propagation.

15. The device of claim 14, wherein the controller is configured to actuate the actuators to magnetically cause the magnet to move within the enclosure for positioning the optical element to direct the light from the light source to the optical waveguide.

16. The device of claim 1, wherein the light emitted from the light source is synchronized with the actuation of the actuators to move the optical element in horizontal and vertical directions to produce a viewable image in a two-dimensional field of view (FOV).

17. The device of claim 16, wherein a resolution of the viewable image is based on at least on a horizontal scan rate and a vertical scan rate.

18. The device of claim 16, wherein the FOV is a spherical or elliptical.

19. The device of claim 16, wherein the viewable image is a foveated image.

20. The device of claim 19, wherein a high resolution portion of the foveated image is movable based on an eye position.

* * * * *